Feb. 17, 1970 C. J. VAN DALEN 3,496,538

RHYTHMIC TELECOMMUNICATION SYSTEM WITH AUTOMATIC ERROR CORRECTION USING TWO SERVICE SIGNALS

Filed March 8, 1967 3 Sheets-Sheet 1

INVENTOR.
CHRISTIAAN J. VAN DALEN
BY Hugh A. Kirk
ATTORNEY

Feb. 17, 1970 C. J. VAN DALEN 3,496,538

RHYTHMIC TELECOMMUNICATION SYSTEM WITH AUTOMATIC ERROR CORRECTION USING TWO SERVICE SIGNALS

Filed March 8, 1967 3 Sheets-Sheet 2

INVENTOR.
CHRISTIAAN J. VAN DALEN
BY Hugh A. Kirk
ATTORNEY

INVENTOR
CHRISTIAAN J. VAN DALEN
BY
Hugh A. Kirk
ATTORNEY 3,496,538

RHYTHMIC TELECOMMUNICATION SYSTEM WITH AUTOMATIC ERROR CORRECTION USING TWO SERVICE SIGNALS

Christiaan Johannes van Dalen, Voorburg, Netherlands, assignor to De Staat der Nederlanden, Ten Deze Vertegenwoordigd Door de Directeur-General der Posterijen, Telegrafie en Telefonie, The Hague, Netherlands
Continuation-in-part of application Ser. No. 287,931, June 14, 1963. This application Mar. 8, 1967, Ser. No. 621,677
Claims priority, application Netherlands, June 28, 1962, 280,307
Int. Cl. G08b 29/00
U.S. Cl. 340—146.1 5 Claims

ABSTRACT OF THE DISCLOSURE

A multichannel duplex automatic error correction (ARQ) telecommunication system in which each channel is terminated by separate individual transmitting and receiving sets. In order that a mutilated signal can be repeated in the same channel at the next step, use is made of two different special service signals. Successive signals in a channel are numbered in alternate groups and a similar numbering is applied to undisturbed signals received, as well as to said two corresponding special service signal, so that as soon as a correct traffic signal is received at either station associated with the same group number as the signal at that station just transmitted, then the next signal of the next group is transmitted from that station, otherwise a special service signal is transmitted to request a repetition of the proper signal.

RELATED APPLICATIONS

Priority Netherlands patent application Ser. No. 280,-307, filed June 28, 1962, and U.S. patent application Ser. No. 287,931 filed June 14, 1963, now abandoned, of which this application is a continuation-in-part.

BACKGROUND OF INVENTION

In well known systems of automatic error correction telegraphy, the repetition of a mutilated signal causes the stations to be switched over from the traffic condition to a repetition cycle, during which the error is corrected by repetition. Such a system is disclosed in Van Duuren et al. U.S. Patent No. 3,156,767. Owing to the finite propagation time of the signals, this repetition cycle must occupy a number of signal steps, usually four or less.

There also is another related system in which the signals are associated with separate numbered groups I and II, disclosed in Van Dalen et al. U.S. Patent No. 2,970,189. However, this system is directed to an arythmic telecommunication system as distinguished from a rhythmic system in the present invention. Another basic distinction resides in the ability of each station in the system of the present invention to select whether it is going to be a master station or a slave station, and not always having one station as the master station. Thus in the present invention the slave station always answers while in this Van Dalen et al. patent the slave station only answers after a correct signal is received. Also the special service signals in this Van Dalen et al. patent announce the number of the next signal that is going to be transmitted, while in the present invention the service signal requests the other station to transmit a traffic signal in the requested group. Thus the present system is a more direct system. Furthermore there is no blocking required for repeated signals because the right signal is always requested, while in the former system a blocking of repeated signals must be provided for.

SUMMARY OF INVENTION

This invention is based on the insight that on arrival of a mutilated signal, only the mutilated signal needs to be blocked and that this signal must be repeated at the next step in the relevant channel. This possibility is realized by working each communication channel (attended by some propagation time) individually and at intervals, in which case spaces or gaps remain between the successive signals corresponding to twice the propagation time. When signals are mentioned here, signal blocks may be meant as well. Thus in the said gaps, no signals belonging to the relevant channel may occur. If the air-time is to be used more or less completely and uninterruptedly, the gaps can be filled up with signals of other channels.

Generally speaking, the apparatus for accomplishing the function of the system of this invention includes at each station a master/slave switch which is normally maintained in its slave position and only moves to its master position when a message is to be transmitted, so that the station starting the communication will become a master station and the one receiving it will be a slave station. Also there are provided channels for messages travelling each way from each station, since before the next signal can be transmitted from either station, a signal must be received at that station from the station with which it is communicating. Each station therefore includes transmitting means which may also include code converters for converting a five unit or element telegraph code signal into a constant ratio or balanced code signal for easy error or mutilation detection. A signal frequency generator means is provided for triggering the successive signals from the transmitting means such as a tape transmitter, which frequency generator means also controls a binary counter for associating the signals with alternate numbered groups, that is Group (1) and Group (2). This counter also is connected to a comparator which in turn controls an error detection and a repetition determining circuit to prevent counting and stepping of the tape in the transmitter, and to determine what signals are to be repeated, respectively. There are also separate means at each station for generating the two different types of special service signals corresponding to the two Groups (1) and (2) for requesting a repetition when an error is detected at that station. These two separate special service signal generators are alternately connectable to the transmitting lines corresponding to the condition of the counter.

Each station is also provided with a receiving means which also may include a similar code converter, and also is connected to the error detector and a printer, which printer is maintained connected to the receiver as long as no errors or special service signals are received by it. The receiving means furthermore includes separate detectors for detecting each of the two different special service signals, which are correspondingly compared in the comparator circuit mentioned above, which comparator in turn controls the error detector for stopping the printing and the counting of signals during the requested repetition. This error comparator also controls the repetition determining device for determining which signals are to be transmitted.

Objects and advantages

Accordingly an object of this invention is to produce a rhythmic two-way signalling system with error correction by repetition, which quickly, simply, directly and effectively corrects disturbed signals.

Another object of the invention is to completely inform both ends of the circuit of the position of the counters at each station so that the disturbing time in the case of a simple disturbance is reduced in comparison with the normal disturbing time in a normal repetition system, that is, one employing a system cycle.

Another object is to provide a system wherein the slave station always answers, and the service signal transmitted between the stations requests what the next signal should be so that no blocking of repeated signals is required, thereby saving transmission time over prior systems requiring a repetition cycle.

BRIEF DESCRIPTION OF THE VIEWS

The above mentioned and other features and objects of this invention and the manner of attaining them will become more apparent and the invention itself will be understood best by reference to the following description of an embodiment of the invention taken in conjunction with the accompanying drawings, wherein.

DETAILED DESCRIPTION

Figure 1:
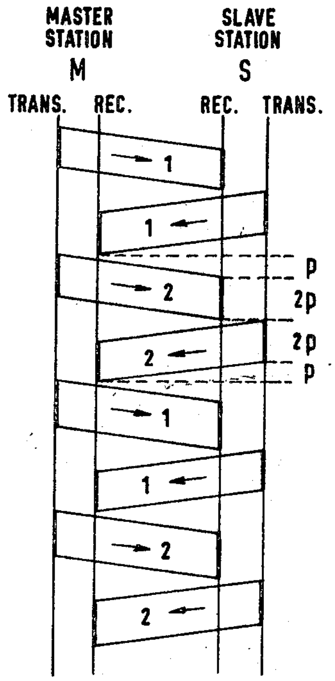
FIG. 1 is a schematic time diagram of a transmitter and receiver of alternate groups of signals between two stations, showing the duration of each group and its propagation time.
Figure 4:
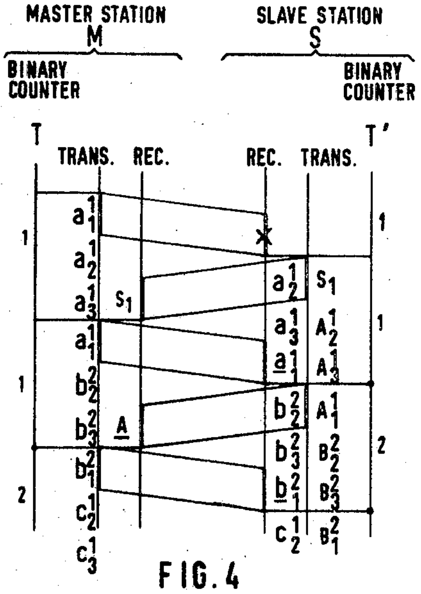
FIG. 4 is a schematic time diagram similar to FIG. 3 but showing interspersed parallel channel and how the counting in each channel is independent from each other.

(1) Signal groups (FIGS. 1 and 4)

Signals transmitted are placed in groups, namely groups 1 and 2, thus: $a^1$, $b^2$,$c^1$, $d^2$ (associated group numbers with each signal of one message or channel). Each of these groups may be accompanied by a number of parallel or sub-groups, for example,$a^1{}_1$,$a^1{}_2$,$a^1{}_3$, etc., the subscripts are for different parallel channels or sub-groups, and each channel contains one signal or a block of signals for filling in the pauses between the transmissions of successive numbered groups of signals of the same message or channel (see FIG. 4). This formation of parallel channels or sub-groups can be omitted, for example, if each main group contains a block of signals. In that case, there is a pause at least equal to twice the propagation time (that is, equal to a whole main group or a block of signals) between one transmission and the transmission of the next block of the same message, but in the next numbered group. With the letters of the successive signals or blocks in the same group, the parallel or sub-groups constitute different texts in separate channels, namely $a^1{}_1$, $b^2{}_1$, $c^1{}_1$, $d^2{}_1$, etc. Thus the duration of the parallel or sub-groups are equal to twice the propagation time, and the total duration of a rotation is equal to $6p$ ($p$=propagation time, see FIG. 1).

A channel distribution for the case in which the transmitter must be fully utilized is shown in FIG. 4, in which small letters $a_1$, $a_2$, $a_3$ are supposed to be transmitted in successive complete transmitting steps and followed by other letters in later complete steps, the sub-scripts indicating how each of these channels is sub-divided for transmission in successive alternate groups.

In the drawings the stations are in a master-slave relation, one master station M being correction-giving and the other slave station S being correction-receiving. As will appear, the present system boils down to having a synchronizing character or element for each separate signal, or group or block of signals, for which reason it is sometimes referred to as a "signal master" system.

Figure 8:
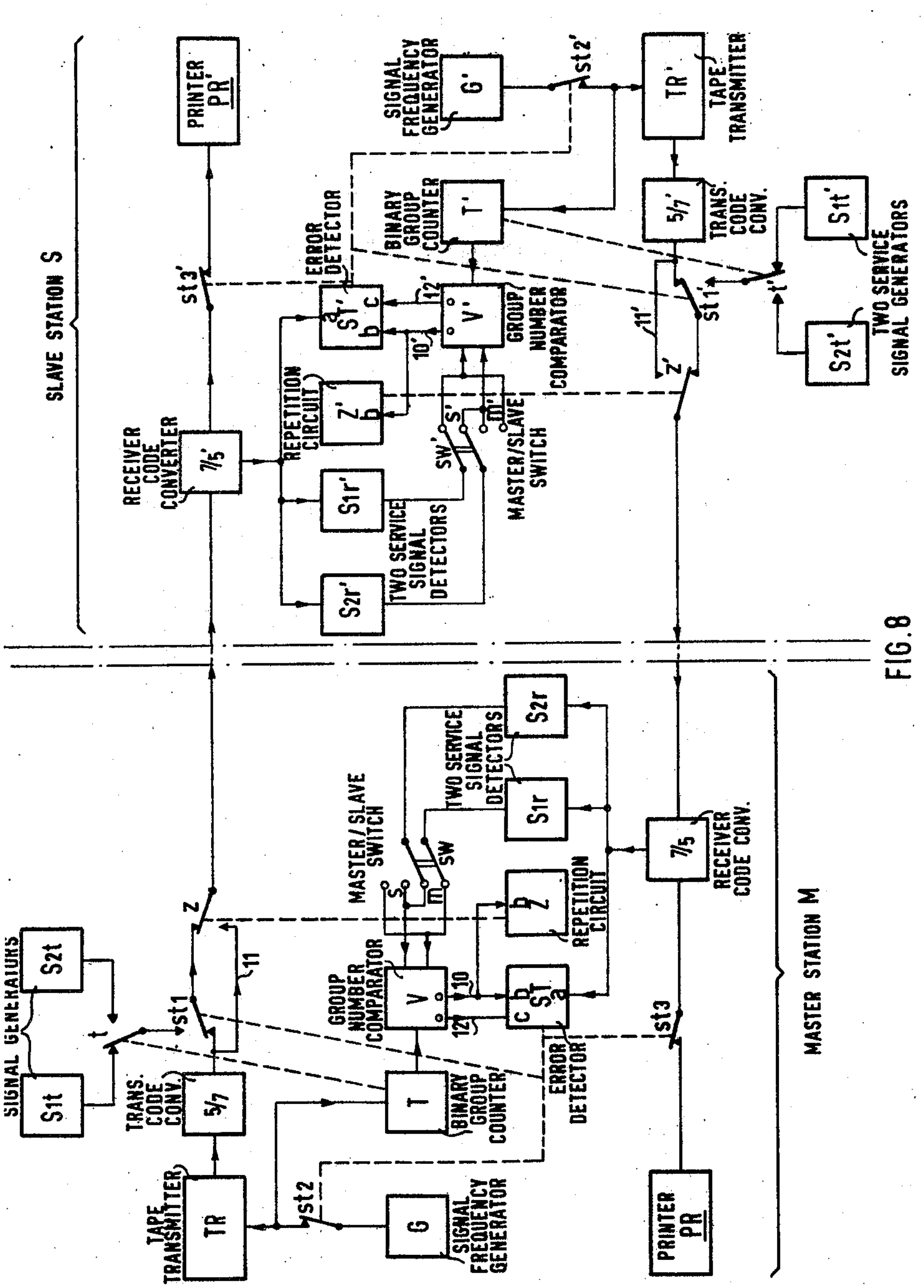
FIG. 8 is a schematic block wiring diagram incorporating the system according to the time diagrams of FIGS 1 through 7, showing similar circuits for both master and slave stations.

(2) The circuit (FIG. 8)

Each one of the stations as shown in FIG. 8 is provided with a master-slave switch SW or SW′ which is normally maintained in the position for slave station, and is only manually changed to its master position when that station wishes to start a transmission.

Furthermore FIG. 8 also shows transmitter code converters 5/7 and 5/7′ and receiver code converters 7/5 and 7/5′ connected at the output of the tape transmitters TR or TR′ and the input of the receivers, respectively, for converting the telegraph codes into a balanced code for easy error detection in the error detection circuits ST or ST′.

Figure 2:
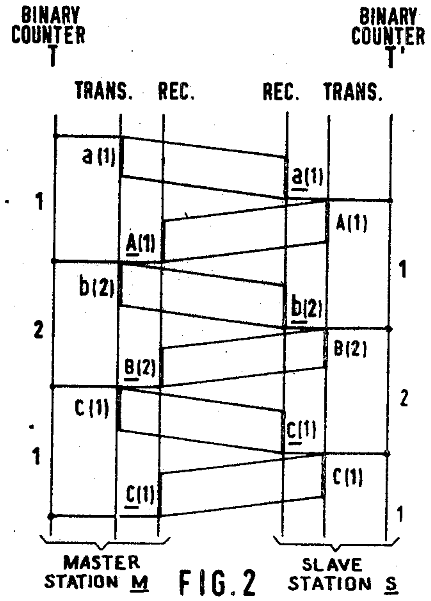
FIG. 2 is a schematic time diagram of a transmitter and a receiver of alternate groups of signals between a master and a slave station, associated with the counter at each station for counting and comparing the groups.

The division in groups 1 and 2 is illustrated in FIGS. 1 and 2 relative to two equivalent stations, M and S. The groups are indicated in a binary group counter (T or T′, see FIG. 8) having two states 1 and 2, which thus locally marks the transmitted and received signals successively by 1–2–2–1 etc. as long as the circuit works undisturbedly. The local mark will only prevent the transmission of the next traffic signal after it has received a disturbed signal or one of the special service signals S1 or S2.

Thus use is made of numbered return paths. So in the time diagrams of FIGS. 2 and 3 there are two such paths. Station M as well as station S are provided with a counting device T, T′ capable of counting to 2, thus marking the return paths locally by 1–2–1–2–1 etc., respectively, as long the connection works undisturbedly (see FIG. 2). Only after the reception of a mutilated signal detected by the error detector ST or ST′ in FIG. 8, will the local transmitter be controlled by switches $st_2$ or $st_{2'}$ to stop the transmission of its next signal by its signal frequency generator G or G′, and simultaneously stop the counting of the counter T or T′, as well as prevent the printing of the mutilated signal by the printer PR or PR′ by opening the switch *st*3 or *st*3′ respectively. According to the state of the local counter T or T′ via contacts *t* or *t′*, which normally passes to the next state after every signal is correctly received, a special service signal or warning signal S1 or S2 is then transmitted (see FIG. 3) from the generators S1*t* or S2*t* or S1*t′* or S2*t′* via the now operated error detector switch *st*1 or *st*1′.

After the transmission of such a warning signal S1 or S2, the local counters T and T′ must remain in their same states because of the opening of contacts *st*2 and *st*2′, so the proper comparison thereof can be made with the special service signals S1 and S2 when they are received. Thus each station is provided with two service signal detectors S1*r* and S2*r* or S1*r′* and S2*r′* for the special service signals S1 and S2 respectively which also operate the error detector ST or ST′ via the group comparator V or V′ at the station where they are received.

Since there is a difference between the master station M and the slave station S in the system of this invention, if the receiver at the master station receives an S1 or an S2 signal and the position of the counter T at the master station is in its 1 or 2 position, respectively, or if in a slave station, the position of the counter T′ in the slave station is in the position 2 or 1, respectively, that is, opposite from that of the signal S1 or S2 received, then the last traffic signal will be repeated or retransmitted from that station by the energization of the error detector circuit ST or ST′ over the conductor 10 or 10′, and simultaneously the energization of the repetition determining circuit Z or Z′ also connected to said conductor 10 or 10′. As stated above the energization of the error detector circuit ST or ST′ operates all of its switch contacts *st*1, *st*2, *st*3, or *st*1′, *st*2′, *st*3′, so as: (a) to prevent the special service signal from being printed or recorded via its contact *st*3, (b) to prevent the counter T or T′ from counting, and (c) to prevent the tape transmitter TR or TR′ from being stepped by the opening of the contact *st*2. However, since the signal which remains in the tape transmitter TR or TR′ to be repeated cannot now be transmitted via the switch *st*1 or *st*1′ which has now been connected with one of the two special service signal generators S1*t* or S2*t* or S1*t′* or S2*t′*, this signal to be repeated is now bypassed and transmitted via the conductor 11 or 11′ and now operated switch *z* or *z′* controlled by the energization of the repetition determining circuit Z.

If on the other hand, the master station M receives a special service signal S1 or S2 and has its counter T in the opposite position from that of the signal S1 or S2, respectively, namely in positions 2 or 1, and similarly if the slave station S has its counter in the same position as the received special service signal S1 or S2, namely in positions 1 or 2, respectively, then a special service signal S1 or S2 is repeated depending upon the position of the counter in that station. This is accomplished by the energization of the error detector circuit ST or ST′ via the conductor 12 or 12′ so as to operate all of the switches *st*1, *st*2, and *st*3 of the error detector switch, but not the bypass switch *z* or *z′* in that the repetition determining circuit Z or Z′ is not now operated.

Figure 5:
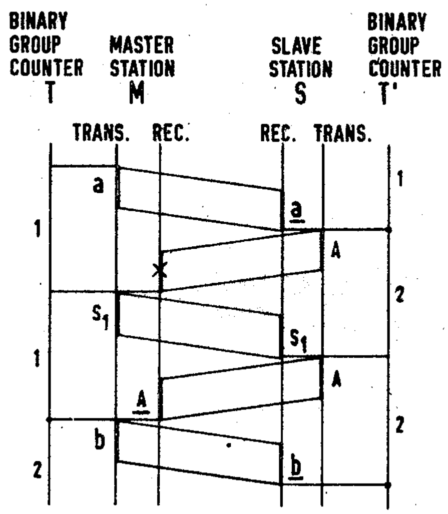
FIG. 5 is a schematic time diagram similar to FIG. 2 indicating an error in reception at the master station and the transmission of the proper service signal for requesting a repetition.
Figure 6:
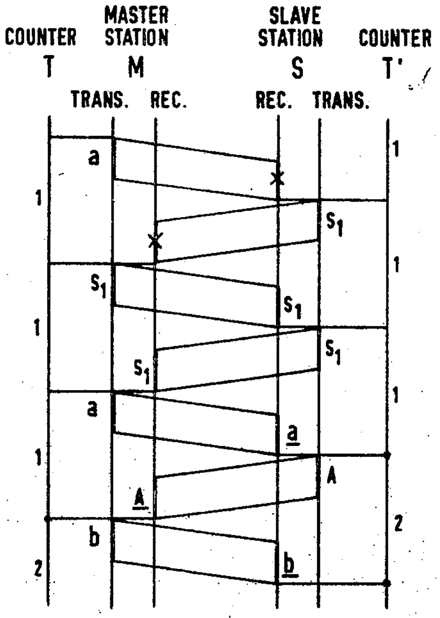
FIG. 6 is a schematic time diagram similar to FIG. 2 showing a mutilated special service signal at the master station and the return of the proper special service signal therefor.
Figure 7:
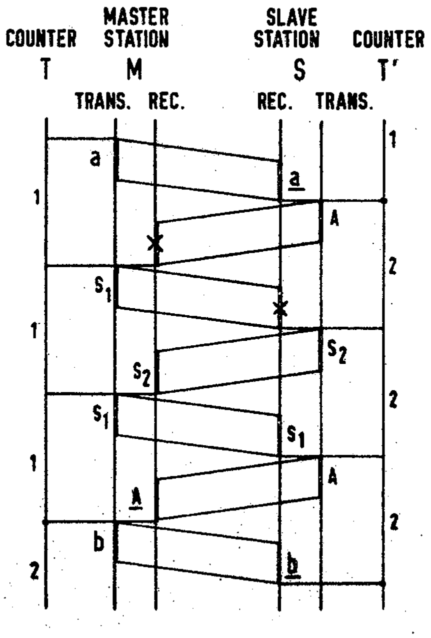
FIG. 7 is a time diagram similar to FIG. 2 showing a mutilation of a special service signal at the slave station and the return of the proper special service signal therefor.

(3) The operation (FIGS. 5 through 7)

Figure 3:
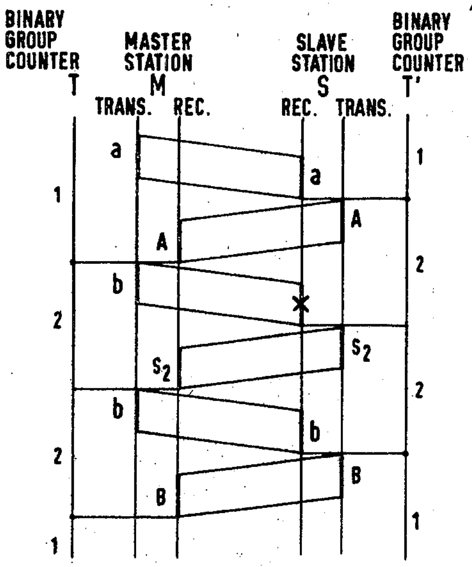
FIG. 3 is a time diagram similar to FIG. 2 indicating an error in reception at the slave station and the transmission of a proper special service signal for requesting a repetition.

The operation of this circuit of FIG. 8 can be seen also in FIG. 3, in which slave station S answers a mutilated signal received by a signal S2 according to the state at that moment of the local counter T′. Now master station M is certain that slave station S has correctly received the (1) group signal, or else the slave station S would have transmitted a signal S1 instead of a signal S2.

Slave station S does not yet know, however, whether the letter "A" or the letter "B" must be sent to master station M, since the letter "A" may have been received correctly at the master station M already, which is actually the case. Now the master station M could also transmit a warning signal, for example here, a signal S1, instead of the letter "*b*" to be repeated, in order to ask complete information, but this costs one signal's time, and this time is gained by the system of this invention. This is the case, because the return paths are dealt with one by one, and only the master station M may decide whether a return path has been dealt with properly and whether the next return path may be taken, this is the "signal master" principle. This implies that the two stations M and S not only relate to element synchronization, but also to rotation synchronization.

Now we come to the following rules:

For the master station M:

(1) A traffic signal received mutilated is answered by the warning or special service signal S1 or S2, the turn of which is indicated by the local counter T (see FIGS. 5, 6 and 7).

(2) A service signal S1 or S2 received is answered by a repetition of the last signal transmitted, if this received signal belongs to the same return path as indicated by the counter T (see FIGS. 3, 4 and 6), whereas it is answered by a service signal S1 or S2 the turn of which it is, if the received signal does not belong to the same return path as that indicated by the counter T (see FIG. 7). In other words if a service signal S1 or S2 is received, it is answered by repetition of the last traffic signal transmitted if this received service signal belongs to the same return path as indicated by the counter T, and if it does not, it is answered by another special service signal S1 or S2 as indicated by the associated counter T of that station.

For the slave station S:

(1) A traffic signal received mutilated is answered by the warning or special service signal S1 or S2, the turn of which is indicated by the local counter T′ (see FIGS. 6 and 7).

(2) A service signal S1 or S2 received is answered by a repetition of the last signal transmitted, if this received signal does not belong to the same return path as indicated by the counter T′ (see FIGS. 5 and 7), whereas it is answered by a service signal S1 or S2 the turn of which it is, if the received signal does belong to the same return path as indicated by the counter T′ (see FIG. 6). In other words, if a special service signal S1 or S2 is received, it is answered by the repetition of the last traffic signal transmitted, if the special service signal received is not the same as that indicated by the counter T′, but if it is the same, it is answered by a special service signal with the group number of the associated counter of that station.

Thus when a slave station S receives back the same group special service signal S1 or S2 it transmitted, it transmits another special service signal of that same group, but if it receives back a special service signal of the other or different group, it transmits the traffic signal associated with the group of the special service signal the slave station first transmitted. Similarly, when a master station M receives back a special service signal S1 or S2 of the other or a different group, it retransmits the same special service signal it transmitted before, but if it receives back a special service signal of the same group, it transmits the traffic signal associated with that same group in the traffic signal associated with the group of the special service signal said master station M first transmitted.

These rules have been applied in FIGS. 4 through 7. FIGS. 4 and 5 show that in the case of one mutilated signal, the repetition cycle has been shortened as compared with the repetition cycle in a normal TOR (telegraph over radio automatic error correction) system described in the above mentioned prior Van Duuren et al. patent.

While there is described above the principles of this invention in connection with specific apparatus, it is to be clearly understood that this description is made only by way of example and not as a limitation to the scope of this invention.

What is claimed is:

1. A rhythmic two-way telecommunication system for traffic signals between two stations, either one of which may be a master station and the other a slave station, each station comprising:

(A) means (TR, TR′, 5/7, 5/7′) for transmitting said traffic signals, (B) means (S1*t* and S2*t*, S1*t′* and S2*t′*) for generating two different special service signals (S1 and S2), (C) binary counter means ((T, T′) for counting each traffic signal transmitted and associating it (*t*, *t′*) with one of two different special service signals (S1 and S2), (D) means (7/5, 7/5′) for receiving all said signals, (E) means (PR, PR′) connected to said receiving means for processing correctly received traffic signals, (F) means (ST, ST′) for detecting when any received signal is mutilated, (G) means (*st*2, *st*3, *st*1 or *st*2′, *st*3′, *st*1′) responsive to said detecting means for stopping the associated transmitting means, the associated binary counter means and the associated processing means at the station and said detecting means, and for transmitting from said station the special service signal associated with the last traffic signal transmitted from that station, (H) separate means (S1*r*, S2*r*, S1*r*′, S2*r*′) for detecting the received special service signals (S1, S2), (I) means (SW) for changing a slave station into a master station when a communication is to be made, and (J) comparator means (V, V′) responsive to said counting means and that said special service means which detected the special service signal, which comparator means (V) in the master station transmits the traffic signal last transmitted if the group number of the service signal corresponds with the counter position and transmits the service signal last transmitted if the group number of the service signal differs from the counter position, and which comparator means (V′) in the slave station transmits the service signal last transmitted if the group number of the service signal corresponds with the counter position and transmits the traffic signal last transmitted if the group number of the service signal differs from the counter position.

2. A system according to claim 1 wherein said processing means is a printing means (PR, PR′).

3. A system according to claim 1 including means (G, G′) for controlling the stepping of said transmitting means and said counting means.

4. A system according to claim 1 wherein said transmitting means and said receiving means includes a code converting means (7/5, 5/7, 7/5′, 5/7′).

5. A system according to claim 1 wherein said comparator means includes a repetition determining means (Z, Z′) for repeating said traffic signal when that is the signal requested by said detected special service signal.

References Cited

UNITED STATES PATENTS

| | | | |
|---|---|---|---|
| 2,988,596 | 6/1961 | Van Dalen | 340—146.1 X |
| 3,272,921 | 9/1966 | Van Duuren | 340—146.1 X |
| 3,381,272 | 4/1968 | Pasini | 340—146.1 |

MALCOLM A. MORRISON, Primary Examiner

R. STEPHEN DILDINE, Jr., Assistant Examiner

PO-1050
(5/69)

UNITED STATES PATENT OFFICE
CERTIFICATE OF CORRECTION

Patent No. 3,496,538 Dated Feb. 17, 1970

Inventor(s) C. J. VAN DALEN

It is certified that error appears in the above-identified patent and that said Letters Patent are hereby corrected as shown below:

Column 3, line 28, "channel" should be -- channels --
Column 4, line 32, "1-2-2-1" should be -- 1-2-1-2-1 --

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents